J. A. RENNIEE.
PROPELLING AND BALANCING APPARATUS FOR AIRSHIPS.
APPLICATION FILED FEB. 23, 1910.
996,728.
Patented July 4, 1911.
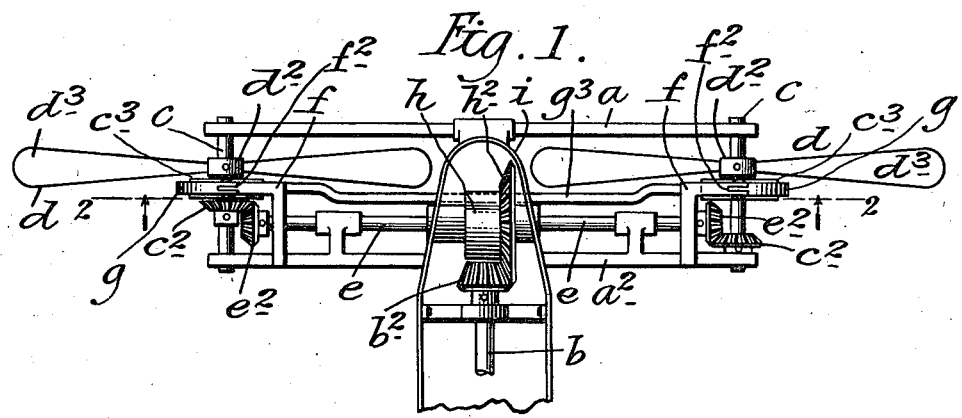
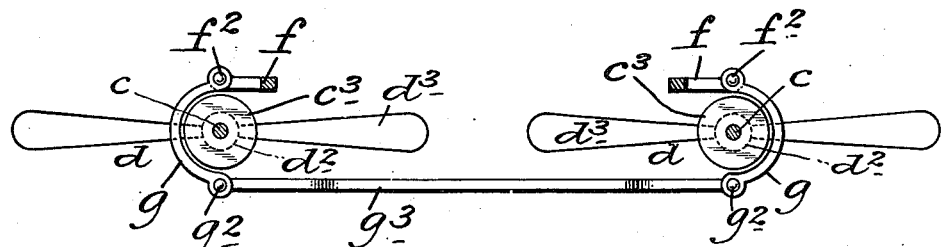
WITNESSES:
INVENTOR
John A. Renniee
BY
ATTORNEYS

UNITED STATES PATENT OFFICE.

JOHN A. RENNIEE, OF NEW YORK, N. Y.

PROPELLING AND BALANCING APPARATUS FOR AIRSHIPS.

996,728.   Specification of Letters Patent.   Patented July 4, 1911.

Application filed February 23, 1910. Serial No. 545,306.

*To all whom it may concern:*

Be it known that I, JOHN A. RENNIEE, a citizen of the United States, and residing at New York, in the county of New York and State of New York, have invented certain new and useful Improvements in Propelling and Balancing Apparatus for Airships, of which the following is a specification, such as will enable those skilled in the art to which it appertains to make and use the same.

This invention relates to airships, or flying machines, and particularly to machines of this class known as aeroplanes, and the object thereof is to provide a machine of this class with an improved propelling mechanism and improved automatic balancing devices which operate in connection with the propellers or propelling mechanism.
The invention is fully disclosed in the following specification, of which the accompanying drawing forms a part, in which the separate parts of my improvement are designated by suitable reference characters in each of the views, and in which :—

Figure 1 is a plan view of a propelling mechanism for airships or machines involving my invention, and; Fig. 2 a section on the line 2—2 of Fig. 1 with part of the construction omitted.

In the accompanying drawing I have shown only my improved propelling and balancing mechanism, the said balancing mechanism operating in connection with the shafts of the propellers, the main frame or parts of the machine being not shown in the drawing, and in the practice of my invention I provide a suitable framework or support for the propelling and balancing mechanism which I employ, which comprises parallel front and back members $a$ and $a^2$, but it will be understood that in the construction of a machine or the application of my improvement thereto, the said frame or support may be built into or form part of the framework of the machine, or may be connected therewith in any desired manner. I have also shown at $b$ the power shaft which, in practice is connected with the motor with which the machine is provided, said motor being also not shown, and said shaft is provided with a beveled gear $b^2$.

Mounted in the opposite end portions of the frame or support are two propeller shafts $c$ provided with propellers $d$, comprising hubs $d^2$ and plates $d^3$ and these propellers are adapted to be turned in vertical or horizontal planes. The shafts $c$ are provided with beveled gears $c^2$ and mounted in said frame or support are two power transmission shafts $e$ arranged in the same line and provided with beveled gears $e^2$ which mesh with the gears $c^2$. The shafts $c$ are also provided with wheels or drums $c^3$ and, in the form of construction shown one of the frame or support members $a$, $a^2$ is provided with angular arms $f$, to which are pivoted as shown at $f^2$ semi-circular brakes $g$ which depend from said arms and the brake wheels or drums $c^3$ and the lower end portions of which are pivoted at $g^2$ to a horizontal connecting rod $g^3$. The power transmission shafts $e$ extend into and are connected with a differential power transmission gear device $h$ which involves in its construction a beveled gear wheel $h^2$, with which the gear $b^2$ on the main drive or gear $b$ meshes.

The details of the construction of the differential power transmission device or apparatus $h$ are not shown, for the reason that they form no part of my invention, but the said device may be of any of the well known constructions and may be similar to devices of this class employed in automobiles and similar vehicles; but the construction and operation of this device is such as to turn the shafts $e$ at the same rate of speed and also to allow one of the said shafts to turn free and independent of the other. The differential power transmission device $h$ is also, in the form of construction shown, partially inclosed by a yoke-shaped frame or support $i$ built into or forming a part of the main frame or support of the propeller shafts $c$, but my invention is not, as hereinbefore stated, limited to any particular means for supporting the propeller shafts $e$ or the other parts of the propelling and balancing mechanism, said balancing mechanism consisting of the wheels or drums $c^3$ mounted on the shafts $c$ and the semi-circular brakes $g$ pivotally supported, and the connecting means $g^3$ pivoted to said brakes.

In the operation of a flying machine provided with my improvement the brakes $g$ are free to swing in a vertical plane under the influence of gravity, and if at any time one side of the machine is elevated above the other one of the brakes $g$ will drop into contact with the adjacent brake wheel or drum $c^3$, and the movement of the corresponding propeller will be checked as will be readily understood, and the opposite propeller will continue in operation at the desired speed, and in this way the equilibrium or proper balance of the machine will be automatically provided for at all times.

Having fully described my invention, what I claim as new, and desire to secure by Letters Patent, is:—

1. In a propelling mechanism for flying machines, parallel propeller shafts provided with propellers, means for driving said shafts, brake drums connected with said shafts, gravity brake devices pivotally supported above said drums and adapted to operate in connection therewith and a horizontal rod connecting said brake devices.

2. In a propelling mechanism for flying machines, parallel propeller shafts provided with propellers, means for driving said shafts, brake drums connected with said shafts, semi-circular gravity brake devices pivotally supported above said drums and adapted to operate in connection therewith and a horizontal rod pivoted to said brake devices.

In testimony that I claim the foregoing as my invention I have signed my name in presence of the subscribing witnesses this 21st day of February 1910.

JOHN A. RENNIEE.

Witnesses:
C. E. MULREANY,
B. M. RYERSON.